United States Patent [19]

Sorin

[11] Patent Number: 5,473,432

[45] Date of Patent: Dec. 5, 1995

[54] APPARATUS FOR MEASURING THE THICKNESS OF A MOVING FILM UTILIZING AN ADJUSTABLE NUMERICAL APERTURE LENS

[75] Inventor: Wayne V. Sorin, Mountain View, Calif.

[73] Assignee: Hewlett-Packard Company, Palo Alto, Calif.

[21] Appl. No.: 304,247

[22] Filed: Sep. 12, 1994

[51] Int. Cl.⁶ .................................................. G01B 9/02
[52] U.S. Cl. ........................................ 356/357; 356/345
[58] Field of Search .................................. 356/345, 355, 356/357, 358; 250/227.19, 227.27

[56] References Cited

U.S. PATENT DOCUMENTS 3,319,515  5/1967  Flournoy.
5,341,205  8/1994  McLandrich et al. .................. 356/357

OTHER PUBLICATIONS

R. A. Patten, "Michelson Interferometer as a Remote Gauge", Applied Optics, Dec. 1971, vol. 10, No. 12.
P. A. Flournoy, R. W. McClure, and G. Wyntjes, "White–Light Interferometric Thickness Gauge", Applied Optics, Sep. 1972, vol. 11, No. 9.

Primary Examiner—Samuel A. Turner
Assistant Examiner—Robert Kim

[57] ABSTRACT

An apparatus for measuring the thickness of a moving film. The apparatus utilizes a low coherence light source to generate a light signal that is directed at the film with the aid of an optical fiber and lens. A portion of the light reflected from the film is collected and coupled to an interferometer to generate an interference light signal comprising the coherent sum of first and second light signals. The first light signal comprises the collected light signal, and the second light signal comprises the collected light signal offset in time with respect to the first light signal. The offset is varied in time and the interference light signal intensity is measured for the various time offsets. In the preferred embodiment, the numerical aperture of the light focused onto the film may be varied to optimize the light collection for the specific properties of the carriage system used to move the film. The offset is preferably measured by adding a reference light signal with the collected light signal and then detecting the interference pattern generated in the interferometer by the reference light signal.

6 Claims, 2 Drawing Sheets

APPARATUS FOR MEASURING THE THICKNESS OF A MOVING FILM UTILIZING AN ADJUSTABLE NUMERICAL APERTURE LENS

FIELD OF THE INVENTION

The present invention relates to optical reflectometry, and more particularly, to an apparatus for measuring the thickness of a moving thin film.

BACKGROUND OF THE INVENTION

In many industrial processes, control of film thickness is of critical importance. For example, the manufacture of photographic film requires the generation of a uniform layer of emulsion on a backing. From the point of view of process control, it is advantageous to be able to measure the film thickness during the film generation process rather than measuring the film in a laboratory after the film has been manufactured. If samples are measured off-line, correction of any machinery malfunction cannot be performed until after a considerable volume of defective material has been processed. This leads to waste.

Methods for measuring the thickness of films using a Michelson interferometer are known to the art. For example, U.S. Pat. No. 3,319,515 to Flournoy describes the use of a Michelson interferometer for measuring the thickness of a film. In this system, the film is illuminated with a collimated light beam at an angle with respect to the surface of the film. The front and back surfaces of the film generate reflected light signals. The distance between the two reflecting surfaces is then determined by examining the peaks in the autocorrelation spectrum generated in a Michelson interferometer that receives the reflected light as its input.

While the arrangement taught by Flournoy is claimed to function adequately for the measurement of films, the apparatus taught therein is less than ideal. First, the Michelson interferometer must be located close to the film under measurement. The device taught by Flournoy utilizes a collimated light beam generated from a point light source. The amount of light available at the Michelson interferometer depends on the solid angle subtended by the Michelson interferometer as viewed from the light source. This solid angle decreases rapidly with distance; hence, both the source and Michelson interferometer must be very close to the film. Optical instruments such as the Michelson interferometer are poorly suited for location in manufacturing environments which tend to be dirty.

Second, the device taught by Flournoy is very sensitive to the angle of incidence of the light beam on the film. Small alignment errors can lead to errors in the thickness measurement. Even in instruments in which the incident light beam is perpendicular to the film surface, angular alignment errors can cause the reflected light to miss the entrance of the Michelson interferometer.

Third, prior art devices rely on calibrations done prior to the actual measurement to provide an accurate measurement of the position of the moveable mirror in the Michelson interferometer. Due to changes in mechanical linkages or thermal expansions and contractions, these calibration methods provide limited accuracy when used to measure thin films.

Fourth, prior art devices utilize white light sources such as heated filaments to generate the low coherence light signal that is directed at the film. Unfortunately, the amount of light reflected at the film boundaries is quite small. Since these light sources are limited in power, the sensitivity of measurements using this type of light source is limited by signal to noise considerations.

Broadly, it is the object of the present invention to provide an improved apparatus for measuring the thickness of a moving film.

It is a further object of the present invention to provide an apparatus that may be placed in a location remote from the film under measurement.

It is a still further object of the present invention to provide an apparatus that is less sensitive to angular alignment or longitudinal motion problems than prior art devices.

It is yet another object of the present invention to provide an apparatus that does not depend on calibrations performed prior to the actual measurements.

It is a still further objective of the present invention to provide an apparatus having a higher powered low coherence light source thereby providing better signal to noise ratios than obtainable with prior art white light sources.

These and other objects of the present invention will become apparent to those skilled in the art from the following detailed description of the invention and the accompanying drawings.

SUMMARY OF THE INVENTION

The present invention is an apparatus for measuring the thickness of a moving film. The apparatus utilizes a low coherence light source to generate a light signal that is directed at the film with the aid of an optical fiber and lens. A portion of the light reflected from the film is collected and coupled to an interferometer to generate an interference light signal comprising the coherent sum of first and second light signals. The first light signal comprises the collected light signal, and the second light signal comprises the collected light signal offset in time with respect to the first light signal. The offset is varied in time and the interference light signal intensity is measured for the various time offsets. In the preferred embodiment, the numerical aperture of the light focused on the film may be varied to optimize the light collection for the specific properties of the mechanical system used to move the film. The offset is preferably measured by adding a reference light signal with the collected light signal and then detecting the interference pattern generated in the interferometer by the reference light signal.

DETAILED DESCRIPTION OF THE INVENTION

Figure 1:
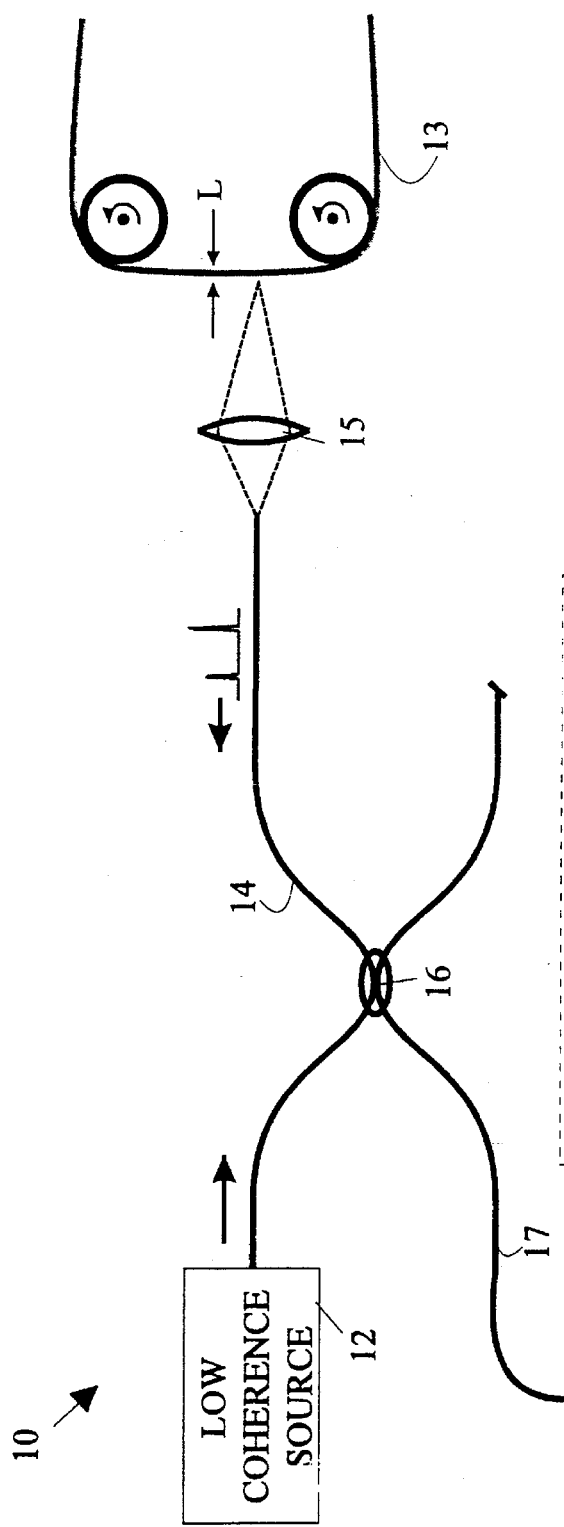
FIG. 1 is a block diagram o apparatus according to the present invention for measuring the thickness of a film.
Figure 2:
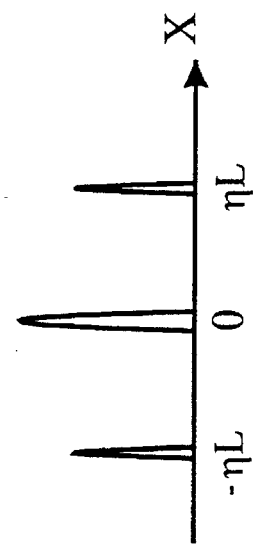
FIG. 2 illustrates the signal generated by the Michelson interferometer shown in FIG. 1.

The present invention may be more easily understood with reference to FIGS. 1 and 2 which illustrate the measurement of the thickness of a film 13 moving past an apparatus 10 according to the present invention. Apparatus 10 illuminates film 13 with low coherence light generated by source 12 which is preferably an edge emitting light emitting diode. The light is delivered to film 13 via optical fiber 14 and lens 15. Optical fiber 14 is preferably a single mode optical fiber. Lens 15 focuses the light onto film 13 and collects a portion of the reflected light which is imaged back into fiber 14. A portion of the collected light is delivered to a Michelson interferometer 18 via directional coupler 16 and fiber 17. Optical directional couplers for use with fiber optics are well known to the art, and hence, will not be discussed in more detail here.

The light delivered to Michelson interferometer 18 includes two signals which result from the refection of the light incident on film 13 at the two surfaces of film 13. If film 13 has an index of refraction equal to $\eta$ and a thickness of L, the two light signals will be separated in time by $2\eta L/c$, where c is the speed of light. The light incident on Michelson interferometer is split into two beams that traverse different paths by beam splitter 19. The first path is determined by the position of fixed mirror 20 and the second by moveable mirror 21. After traversing the different paths, the light is recombined by splitter 19 and directed to a photodiode 22 which measures the intensity of the light which varies with the position of mirror 21 due to the interference of the light.

The envelope of the interference pattern as a function of the position, X, of mirror 21 is shown in FIG. 2. This function has three peaks. The large peak at X=0 results when the optical paths are equal in length, and hence, the light from both peaks coherently interfere. The two smaller peaks result from the cases in which the paths differ by the delay between the first and second peaks. In one of these cases, the first peak interferes with the second peak. The remaining peak corresponds to the interference of the second peak in one arm of the Michelson interferometer with the first peak in the other arm.

Since the present invention utilizes optical fibers to deliver the light to the film and collect the reflections therefrom, the Michelson interferometer can be located at some distance from the film under measurement. As noted above, prior art devices that utilized a Michelson interferometer to measure film thickness were required to be close to the film being measured. Hence, the present invention overcomes this shortcoming of the prior art.

Lens 15 also provides a means for adjusting the light collection efficiency of the system to movements of the film being measured. For the purpose of the present discussion, "flutter" will be defined to be the motion of the film along the optical axis of lens 15. If the light from lens 15 is tightly focused, i.e., focused light has a high numerical aperture, then the collection efficiency will be very sensitive to flutter. In a tightly focused system, flutter causes the boundary of the film to move in and out of focus. When the boundary is out of focus, the light collected by lens 15 and re-injected into fiber 14 is substantially reduced. Hence, if the film is mounted so as to produce a significant amount of flutter, lens 15 preferably has a low numerical aperture. For purposes of this discussion, the numerical aperture of the lens is defined to be the maximum angle at which light impinges on the film relative to the optical axis of lens 15. The numerical aperture may be adjusted by changing the focal length of lens 15, or the distance between the end of the fiber and lens 15.

However, if a low numerical aperture lens is used, the amount of light re-injected into fiber 14 will be a sensitive function of the angle between the optical axis of lens 15 and the film surface. Systems with high numerical apertures are less sensitive to angular variations. It should be noted that at high film movement speeds, the motion of the film may be viewed as a combination of flutter and angular misalignment. By adjusting the numerical aperture of lens 15 the best compromise can be obtained for any given arrangement.

The accuracy with which the position of mirror 21 can be measured using conventional measuring and calibration techniques limits the accuracy of the measurement of the film thickness. In principle, the actuator that moves mirror 21 can be calibrated by using a reference coherent light source as the input to Michelson interferometer 118 and counting the resulting interference fringe pattern to calibrate the actuator. Unfortunately, temperature, changes in mechanical linkages, and other factors limit the reliability of the calibration.

Figure 3:
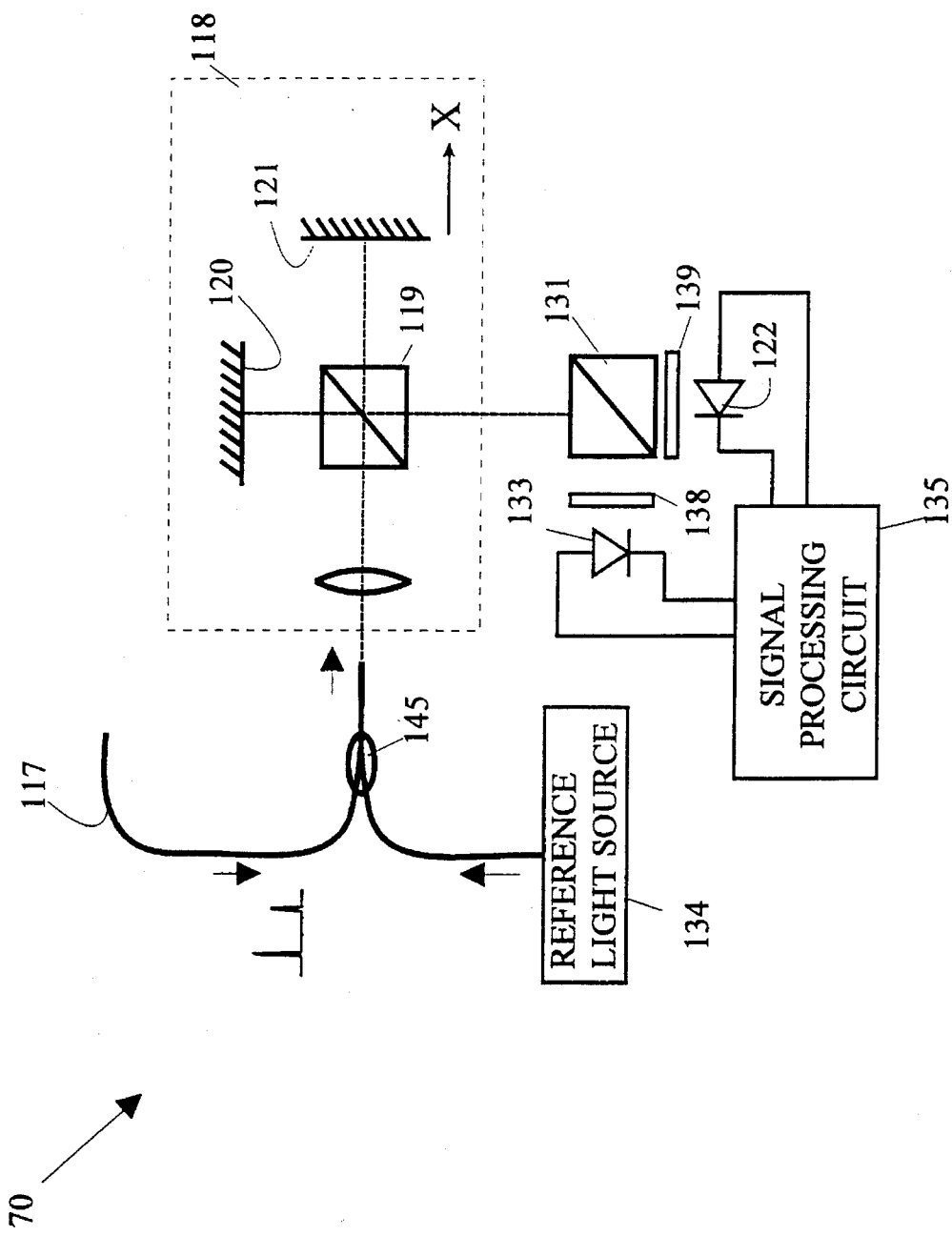
FIG. 3 is a block diagram of the preferred embodiment of a Michelson interferometer system according to the present invention.

To overcome this problem, the present invention preferably uses a second light source to measure the travel of mirror 121 during the measurement of the film. Refer now to FIG. 3 which is a block diagram of the preferred embodiment of the Michelson interferometer system 70 used in the present invention. To simplify the discussion, an element in FIG. 3 that serves the same function as a corresponding element in FIG. 1 is numbered with a number that differs by 100 from that of the number of the corresponding element shown in FIG. 1. In system 70, light from a reference light source 134 which is preferably a laser is added to the light reflected from the film with the aid of a coupler 145 that adds light from source 134 to the light from the film coupled through fiber 117. The light from the reference source gives rise to interference fringes at the reference light frequency. The intensity of light from these fringes goes through one maximum for every one half wavelength that mirror 121 moves. The reference wavelength is chosen to be sufficiently different from that of the light reflected from the film that the two signals may be separated with the aid of a beam splitter 131 and optical filters 138 and 139. Alternatively, a dichotic beam splitter may be used. The reference fringe pattern is detected by photodiode 133 which serves as a reference input to signal processing circuit 135. Signal processing circuit 135 samples the output of photodiode 122 utilizing the reference fringe pattern for timing. Since the reference fringe pattern effectively calibrates the distance X during the actual measurement, the above-mentioned problems with calibrations is overcome. Using a reference light signal for distance measurement allows an absolute distance calibration that is accurate to better than the wavelength of the reference light.

Various modifications to the present invention will become apparent to those skilled in the art from the foregoing description and accompanying drawings. Accordingly, the present invention is to be limited solely by the scope of the following claims.

What is claimed is:

1. An apparatus for measuring the thickness of a film, said apparatus comprising:

low coherence source means for generating a light signal;

first light coupling means for directing said light signal at said film and for collecting light reflected from said film to generate a collected light signal, said first light coupling means comprising an optical fiber and a lens having an adjustable numerical aperture for focusing the light leaving said fiber onto said film;

second light coupling means for coupling said collected light signal to an interferometer to generate an interference light signal comprising the coherent sum of first and second light signals, said first light signal comprising said collected light signal and said second light signal comprising said collected light signal offset in time with respect to said first light signal;

means for varying said offset in time; and means for detecting said interference light signal and said offset for different values of said offset.

2. The apparatus of claim 1 wherein said optical fiber is a single mode optical fiber.

3. The apparatus of claim 1 wherein said low coherence light source comprises an edge emitting LED.

4. An apparatus for measuring the thickness of a film, said apparatus comprising:

low coherence source means for generating a light signal;

first light coupling means for directing said light signal at said film and for collecting light reflected from said film to generate a collected light, signal, said first light coupling means comprising an optical fiber and a lens having an adjustable numerical aperture for focusing the light leaving said fiber onto said film;

second light coupling means for coupling said collected light signal to an interferometer to generate an interference light signal comprising the coherent sum of first and second light signals, said first light signal comprising said collected light signal and said second light signal comprising said collected light signal offset in time with respect to said first light signal;

means for varying said offset in time; and means for detecting said interference light signal and said offset for different values of said offset, wherein said means for detecting said offset comprises:

means for generating a reference coherent light signal having a frequency different from the frequency of said collected light signal;

means for combining said reference coherent light signal with said collected light signal; and means for detecting a reference fringe pattern in said interference light signal.

5. The apparatus of claim 4 wherein said optical fiber is a single mode optical fiber.

6. The apparatus of claim 4 wherein said low coherence light source comprises an edge emitting LED.

\* \* \* \* \*